J. E. ENGSTAD.
PROCESS OF PREPARING CEREAL FOOD.
APPLICATION FILED MAR. 29, 1916.
1,231,143.
Patented June 26, 1917.
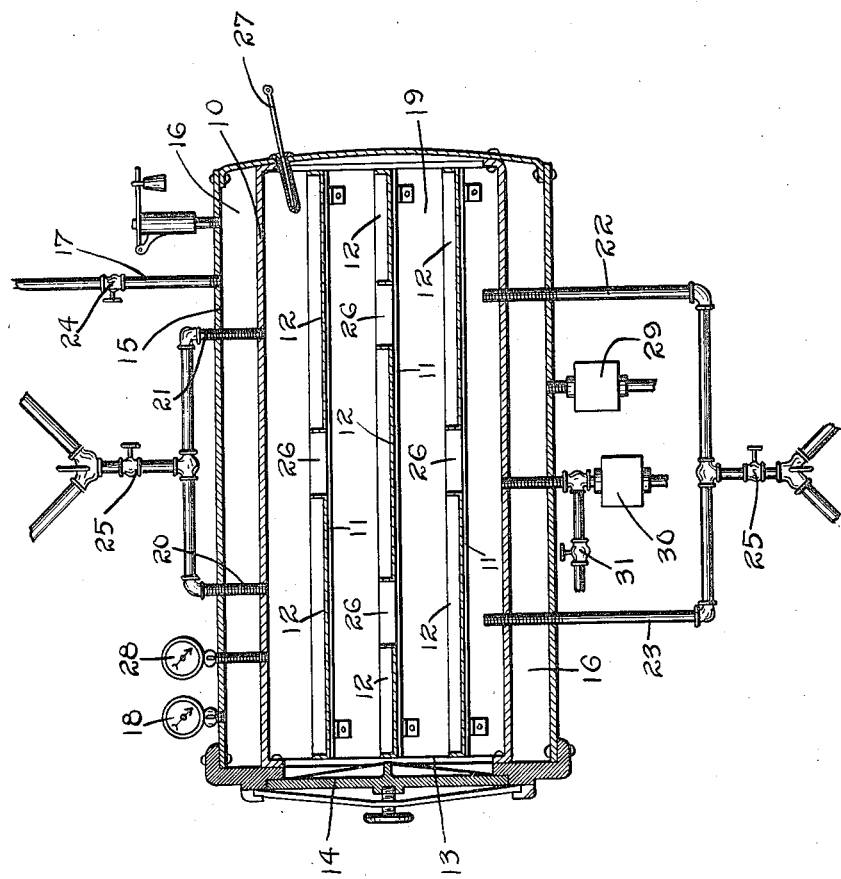
Witnesses:
Alex. Lagaard
A. M. Royal
Inventor:
John E. Engstad
By A. A. Whiteley
his Attorney.

UNITED STATES PATENT OFFICE.

JOHN E. ENGSTAD, OF MINNEAPOLIS, MINNESOTA.

PROCESS OF PREPARING CEREAL FOOD.

1,231,143.      Specification of Letters Patent.      Patented June 26, 1917.

Application filed March 29, 1916. Serial No. 87,448.

*To all whom it may concern:*

Be it known that I, JOHN E. ENGSTAD, a citizen of the United States, residing at Minneapolis, in the county of Hennepin and State of Minnesota, have invented certain new and useful Improvements in Processes of Preparing Cereal Food, of which the following is a specification.

My invention relates to a cereal food product and the method of preparing the same; and it is the primary object of my invention to provide a granular cereal food product in dry form susceptible of ready cartoning and ready transportation in which the grains will have been subjected to a preliminary treatment that will have broken up the starch envelops and practically have cooked the same without involving absorption of moisture or increase in bulk of the product. The food so treated will require but little cooking and when prepared for the table will have special characteristics of nutrition and palatability.

The primary step of carrying out my invention consists in subjecting the granular cereal meal, which may be milled in varying degrees of coarseness or fineness as desired, to hot dry steam at a very considerable pressure, of a temperature well above the condensation point of such steam, but below the point at which the cereal grains will be affected injuriously as to flavor by such heat. To prevent condensation of the steam upon the grains of the cereal itself, it is desirable to subject the granular meal to a preliminary heating process. The temperature limits of the steam are important, as it is essential to subject the granular cereal meal to the dry steam for a very considerable period of time, and if the temperature and pressure of the steam are too low the grains will absorb moisture in an undesirable way, and if the temperature of the steam is too high the heat will affect the chemical constituents in such a way as to injure the flavor of the food, giving it a burned taste. From extensive experiments, and in connection with the manufacture of this food, I have discovered that the maximum and minimum degrees of temperature at which the dry steam should be applied to the meal are two-hundred-and-sixty-five degrees Fahrenheit and two-hundred-and-thirty-five degrees Fahrenheit, and that the best results are obtained at a temperature of from two-hundred-thirty-five degrees to two-hundred-fifty degrees Fahrenheit.

The effect of the hot dry steam under pressure at these temperatures upon the grains of the meal is to cause rupture of the cellulose envelops surrounding the starch grains and free the starch for absorption of water in the cooking process, while at the same time little or no water is actually absorbed during the steaming process and the physical characteristics of the grains of the meal are not altered. That is, the grains retain their shape and size and the bulk of a given quantity of meal is not increased.

An apparatus for carrying out my improved process to produce the granular cereal food product of my invention is illustrated in the accompanying figure, which constitutes a sectional elevation view of a form of apparatus for the purpose. It is to be understood, however, that other forms of apparatus for accomplishing the steps of my process to produce my new food product may be employed and that the form herein shown is referred to primarily for illustrative purposes only.

As shown, a central casing 10 is provided with sets of ways 11 adapted to receive trays 12 containing the granular meal, which trays may be inserted through an opening 13 at the end of the casing, which opening is closed steam-tight by a closure 14 of any well-known construction. Surrounding casing 10 is a second casing 15 which provides a space 16 extending around the chamber formed by casing 10 and separated in steam-tight relation therefrom. Steam may be admitted through a pipe 17 into the chamber 16, the pressure of which is determined by a gage 18. Steam may be introduced into the chamber 19 within the casing 10, preferably through a multiplicity of pipes 20, 21, 22 and 23, the steam in the several pipes being controlled by cut-off valves 24, 25 in a well-known way.

In practising the steps of my method the trays 12, having the granular meal thereon, will be placed in the chamber 19 with small spaces 26 left between the adjacent edges of pairs of trays. The chamber will then be closed by the closure 14 and steam turned into chamber 16. This will heat the interior of chamber 19, and when the temperature has risen to above the condensation point, as indicated by a thermometer 27, steam will be turned into chamber 19. This steam will be thoroughly dried by any of the approved methods used in connection with boilers, and the pipes 20, 21, 22 and 23 will preferably be insulated so that the steam will enter the chamber 19 in its dry condition and without any condensation vapor. A gage 28 indicates the pressure of the steam, which, with thermometer 27, will show the condition in chamber 19. A condensation trap pipe 29 leads from chamber 16 and a similar condensation member 30 from chamber 19, although when the apparatus is working properly the latter member will have no use, as there will be no condensation in chamber 19. The steam at the desired pressure and temperature is permitted to remain in contact with the granular meal in the trays 12 for a period varying from fifteen to thirty minutes, according to the coarseness or fineness of the meal being treated. The steam is then turned off, and released to atmosphere by a discharge cock 31, the closure 14 withdrawn and the trays of prepared food removed to be replaced by others.

As a result of this process the granular meal will have had the envelops of the starch pellicles broken up much more effectively than would result in long continued boiling in water. At the same time the starch grains have not been caused to coalesce with the gluten to form a pasty substance, nor have the grains absorbed moisture or changed their outward physical characteristics. The meal will still be dry and granular and will have been perfectly sterilized. When packed in moisture-proof cartons the product will be in condition for shipment and marketing and for ready and satisfactory use. In cooking it will require less water than similar granular meals untreated and will need to be cooked only a few minutes. The resulting food is granular in form, has a distinctive flavor and is exceedingly palatable.

I claim:

1. The process of preparing cereal food products which consists in subjecting the granular meal as it comes from the mill to dry steam under pressure at a temperature of from two-hundred-and-thirty-five to two-hundred-and-fifty degrees Fahrenheit and for a sufficient time to rupture and break up the envelops of the starch pellicles.

2. The process of preparing cereal food products which consists in subjecting the granular meal as it comes from the mill to heat within a closed chamber until said meal is heated above the condensation point of steam, thereafter introducing into said chamber hot dry steam under pressure and maintaining said granular meal in said steam until the envelops of the starch pellicles have been ruptured and broken up.

In testimony whereof I affix my signature in presence of two witnesses.

JOHN E. ENGSTAD.

Witnesses:
F. A. WHITELEY,
H. A. BOWMAN.